US009054975B2

(12) United States Patent
Feldmann et al.

(10) Patent No.: US 9,054,975 B2
(45) Date of Patent: Jun. 9, 2015

(54) VIRTUALIZATION AND REPLAY-BASED SYSTEM FOR NETWORK DEBUGGING

(75) Inventors: Anja Feldmann, Berlin (DE); Srinivasan Seetharaman, Mountain View, CA (US); Andreas Wundsam, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 777 days.

(21) Appl. No.: 12/871,621

(22) Filed: Aug. 30, 2010

(65) Prior Publication Data

US 2012/0051229 A1 Mar. 1, 2012

(51) Int. Cl.
*H04L 12/26* (2006.01)

(52) U.S. Cl.
CPC .............. *H04L 43/12* (2013.01); *H04L 43/04* (2013.01)

(58) Field of Classification Search
CPC .... H04B 7/204; H04L 12/26; H04L 12/2697; H04L 29/08072; H04L 29/06; H04L 43/00; H04L 43/50; H04J 3/14; G11B 5/09; G11B 7/24; G11B 27/3027; G06F 5/173; G06F 11/08; G06F 11/1471; G06F 11/438; G06F 15/16

See application file for complete search history.

(56) References Cited

U.S. PATENT DOCUMENTS

| | | | | |
|---|---|---|---|---|
| 8,130,528 | B2* | 3/2012 | Yan et al. | 365/51 |
| 8,570,861 | B1* | 10/2013 | Brandwine et al. | 370/230 |
| 2006/0013154 | A1* | 1/2006 | Choi et al. | 370/312 |
| 2006/0092806 | A1* | 5/2006 | Ohno | 369/59.25 |
| 2007/0011321 | A1* | 1/2007 | Huntington et al. | 709/224 |
| 2011/0161730 | A1* | 6/2011 | Van Der Merwe et al. | 714/15 |
| 2012/0016983 | A1* | 1/2012 | Ruiz et al. | 709/224 |
| 2012/0170347 | A1* | 7/2012 | Yan et al. | 365/51 |

OTHER PUBLICATIONS

Aguilera et al., Performance debugging for distributed systems of black boxes, ACM SOSP, 2003.
Altekar et al., Odr: Output-deterministic replay for multicore debugging, ACM SOSP, 2009.
Anand et al., Netreplay: a new network primitive, Proc. HOTMETRICS, 2009.
Anderson et al., Full Packet Capture and Offline Analysis on 1 and 10 Gb/s Networks, Technical Report HPL-2006-156, HP Labs, 2006.
Antonelli et al., K. Co, Cryptographic Wiretapping at 100 Megabits, SPIE 16th Int. Symp. on Aerospace Defense Sensing, Simulation, and Controls., 2002.
Bahl et al., Towards highly reliable enterprose network services via inference of multi-level dependencies, ACM Sigcomm, 2007.
Ballani et al., A Study of Prefix Hijacking and Interception in the Internet, ACM Sigcomm, 2007.
Bavier et al., In vini veritas: Realistic and controlled network experimentation, ACM Sigcomm, 2006.

(Continued)

*Primary Examiner* — Andrew Lai
*Assistant Examiner* — Leon Andrews
(74) *Attorney, Agent, or Firm* — Leydig, Voit & Mayer, Ltd.

(57) ABSTRACT

A method and system of analyzing a network to identify a network defect allows user selection of traffic subset to be recorded. After recording the selected traffic subset of the network traffic during network operation, the recorded traffic is then replayed at least in part to the network to replicate, and thus assist in identifying, the network defect.

18 Claims, 13 Drawing Sheets

(56) References Cited

OTHER PUBLICATIONS

Chandrasekaran et al., Remembrance of Streams Past: Overload-sensitive Management of Archived Streams, Proc. Very Large Data Bases, 2004.
Cooke et al., Resource-aware Multi-format Network Security Data Storage, Proc. SIGCOMM LSAD workshop, 2006.
Desnoyers et al., Hyperion: High Volume Stream Archival for Retrospective Querying, Proc. 2007 USENIX Technical Conf, 2007.
Dunlap et al., Revirt: Enabling intrusion analysis through virtual-machine logging and replay, USENIX OSDI, 2002.
Feamster et al., Detecting BGP Configuration Faults with Static Analysis, USENIX NSDI, 2005.
Feldmanmn et al., Locating internet routing instabilities, ACM Sigcomm, 2004.
Fonseca et al., X-trace: A pervasive network tracing framework, USENIX NSDI, 2007.
Geels et al., Friday: Global comprehension for distributed replay, USENIX NSDI, 2007.
Geels et al., Replay debugging for distributed applications, Proc. Usenix, 2006.
Gonzalez et al., Shunting: A Hardware/Software Architecture for Flexible, High-performance Network Intrusion Prevention, Proc. 14th ACM Conf. on Comp. and Comm. Security, 2007.
Gupta et al., Diecast: Testing distributed systems with an accurate scale model, USENIX NSDI, 2008.
Gupta et al., To infinity and beyond: Time warped network emulation, ACM SOSP, 2005.
Haeberlen et al., Netreview: detecting when interdomain routing goes wrong, USENIX NSDI, 2009.
Hower et al., Two hardware-based approaches for deterministic multiprocessor replay, Communications of ACM, 52(6), 2009.
King et al., Debugging operating system with time-traveling virtual machines, Proc. Usenix, 2005.
Lamport, Time, clocks, and the ordering of events in a distributed system, Communications of the ACM, 21(7), 1978.
Leblanc et al., Debugging parallel programs with instant replay. IEEE Transactions on Computers, C-36(4), 1987.
Liu et al., D3s: debugging deployed distributed systems, USENIX NSDI, 2008.
Mahajan et al., User-level internet path diagnosis. SIGOPS Oper. Syst. Rev., 37(5), 2003.
Maier et al., Enriching network security analysis with time travel, ACM Sigcomm, 2008.
McGrath et al., Monitoring & Forensic Analysis for Wireless Networks, Proc. Conf. on Internet Surveillance and Protection, 2006.
McKeown et al., Openflow: enabling innovation in campus networks. ACM Sigcomm CCR, 38(2), 2008.
Micheel et al., Precision timestamping of network packets, Proc. ACM IMW, 2001.
Montesinos et al., Capo: a software-hardware interface for practical deterministic multiprocessor replay, ASPLOS 09: Conference on Architectural support for programming languages and operating systems, 2009.
Reiss et al., Enabling Real-Time Querying of Live and Historical Stream Data, Proc. Statistical & Scientific Database Management, 2007.
Reynolds et al., 40: black-box performance debugging for wide-area systems, Proc. WWW, 2006.
Reynolds et al., Pip: Detecting the unexpected in distributed systems, USENIX NSDI, 2006.
Sekar et al., cStamp: A system for network-wide flow monitoring, Proc. 5th USENIX NSDI, Apr. 2008.
Shanmugasundaram et al., ForNet: A Distributed Forensics Network, Proc. Workshop on Math. Methods, Models and Architectures for Comp. Networks Security, 2003.
Sherwood et al., Carving Research Slices Out of Your Production Networks with OpenFlow, Proceedings of the ACM SIGCOMM Demo, 2009.
Tripathi et al., Crossbow: a vertically integrated qos stack, ACM WREN Workshop, 2009.
Whitaker et al., Configuration debugging as search: Finding the needle in the haystack, USENIX OSDI, 2004.
Wundsam et al., Network troubleshooting with Shadow VNETS, Proc. ACM SIGCOMM Demo Session, 2009.

\* cited by examiner

VIRTUALIZATION AND REPLAY-BASED SYSTEM FOR NETWORK DEBUGGING

FIELD

The invention pertains generally to analysis and repair of communications networks, and more particularly to nonintrusive network debugging.

BACKGROUND

Although electronic information networks of various kinds are all around us today, it is still not generally possible to guarantee that a given electronic information network will function properly for an extended period without error. Nor is it easy to ensure that a complex novel network configuration will function precisely as it was designed to function. Thus, it is often necessary to perform trouble shooting and repair on electronic information networks (either during live operation, or post-facto) to correct a network malfunction or misconfiguration.

Troubleshooting operational networks or debugging novel networking mechanisms is one of the fundamental challenges in networking. Even checking or debugging the configuration of a network is in itself a complex problem, and experience has shown that even minor faults can lead to substantial network downtimes. Moreover, predicting and understanding the interactions between network protocols and network components can be challenging. While there are many tools to support the troubleshooting process of sequential, parallel and even distributed programs there is much less support for troubleshooting from the network perspective.

A necessary complication of network troubleshooting is that the network components, and hence the potential sources of problems, are inherently distributed. Moreover, the input is not under the checker's control, and there may very complex interactions between software and hardware. Therefore, while it is possible to focus debugging efforts on individual components, e.g., particular network nodes or protocols, rather than the overall network, this necessarily does not solve distributed problems or problems occurring at another node or with respect to a protocol other than those upon which the checker has focused. Another challenge for network debugging is the problem of accurately differentiating between faults and abuse.

SUMMARY

In an embodiment of the invention, the invention includes a method of analyzing a network to identify a network defect by receiving a user selection of traffic subset to be recorded and recording the selected traffic subset of the network traffic during network operation. The recorded traffic is then replayed at least in part to the network to replicate, and thus assist in identifying, the network defect.

Further features and aspects of various embodiments of the invention will be appreciated from the following description.

BRIEF DESCRIPTION THE DRAWINGS

DETAILED DESCRIPTION

Figure 1:
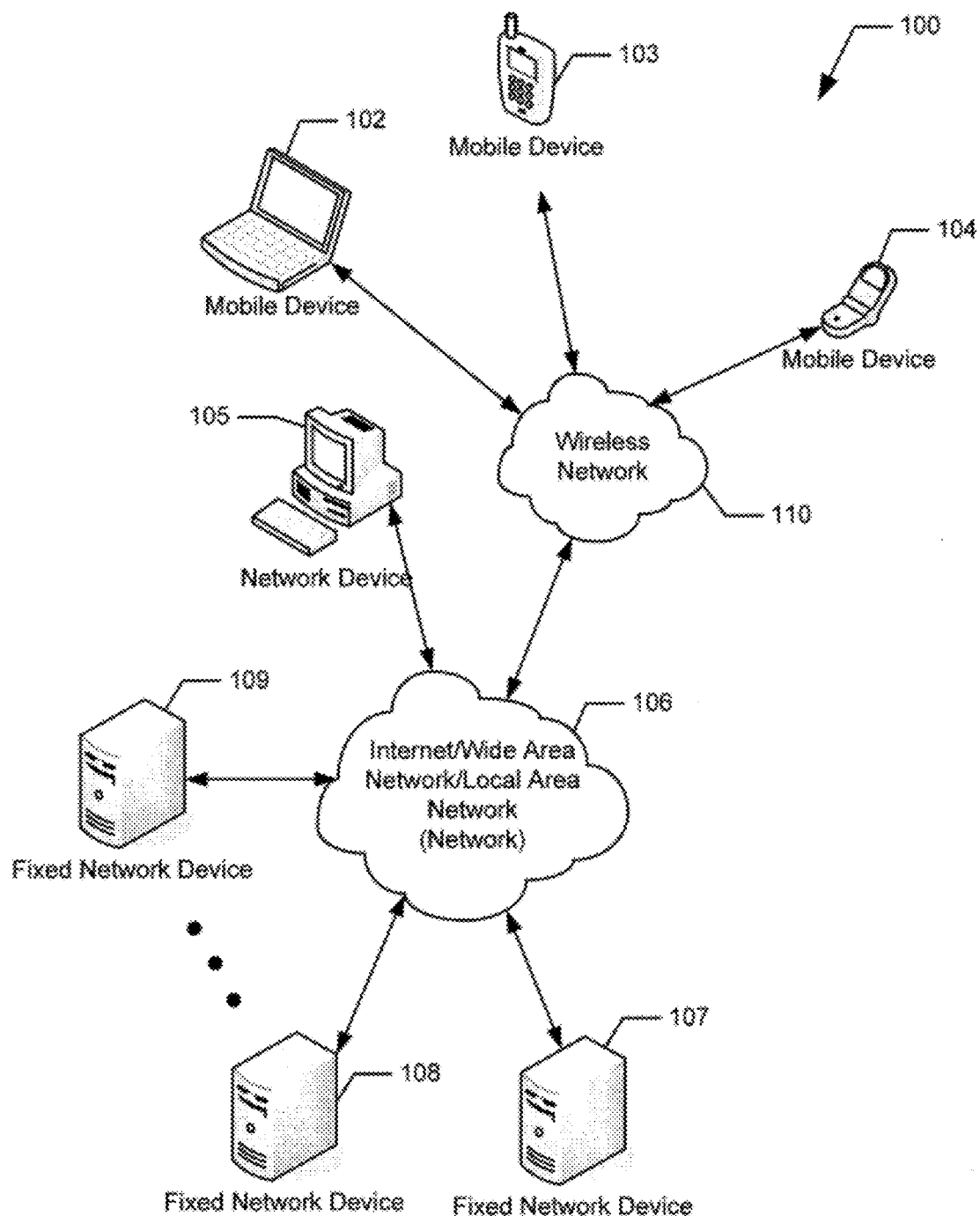
FIG. 1 depicts a network system according to one embodiment of the invention for distributing encoded video data.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, fixed network devices 105 and 107-109.

In general, system 100 has a Peer-to-Peer (P2P) distributed network structure including network nodes (devices) that make a portion of their resources, such as processing power, network bandwidth, or data stored thereon, directly available to other network nodes, without the need for central coordination instances, such as servers or stable hosts. A network node, such as mobile devices 102-104 or fixed network devices 105 or 107-109, can directly request and receive data from a plurality of other participants and assemble them to recover the information. For example, mobile device 102 can request video data be sent from fixed network devices 107-109 in parallel and assemble them to form a single video stream, which is then played back on the screen of the mobile device 102. Because the system 100 is organized in a P2P structure, there is no server-client relationship among the devices 102-105 and 107-109. Each device can potentially contribute to data available within the system 100.

Generally, mobile devices 102-104 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Network device 105 may include virtually any computing device that typically connects using a wired communications medium such as personal computers, multiprocessor systems, microprocessor-based or programmable consumer electronics, network PCs, or the like.

Devices that may operate as network devices 107-109 include personal computers desktop computers, multiprocessor systems, microprocessor-based or programmable consumer electronics, network PCs, servers, and the like.

In general, the fixed network devices 107-109 have higher processing power and larger disk storage and bandwidth, and, therefore, are configured to receive as well as supply resources or data to other participants in system 100. Some of the fixed network devices, on the other hand, such as device 105, have very limited processing power or storage space. Therefore, devices such as 105 are configured as consumers of data, meaning that they only receive data provided by other participants, but do not provide data to other network nodes. Similarly, most mobile devices 102-104 are generally configured as data consumer, which only receive but do not supply data, because of their limited processing power, bandwidth, and storage space.

Server device 107 may further provide a variety of services that include, but are not limited to web services, third-party services, audio services, video services, email services, IM services, SMS services, VoIP services, calendaring services, photo services, or the like. Content may include web content, audio content, video content, FTP data, or the like.

Wireless network 110 is configured to couple mobile devices 102-104 with network 105. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network 105 is configured to couple network devices 105 and 107-109 with other computing devices, including through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network includes any communication method by which information may travel between computing devices.

Illustrative Mobile Devices 102-104 and Network Device 105

Figure 2:
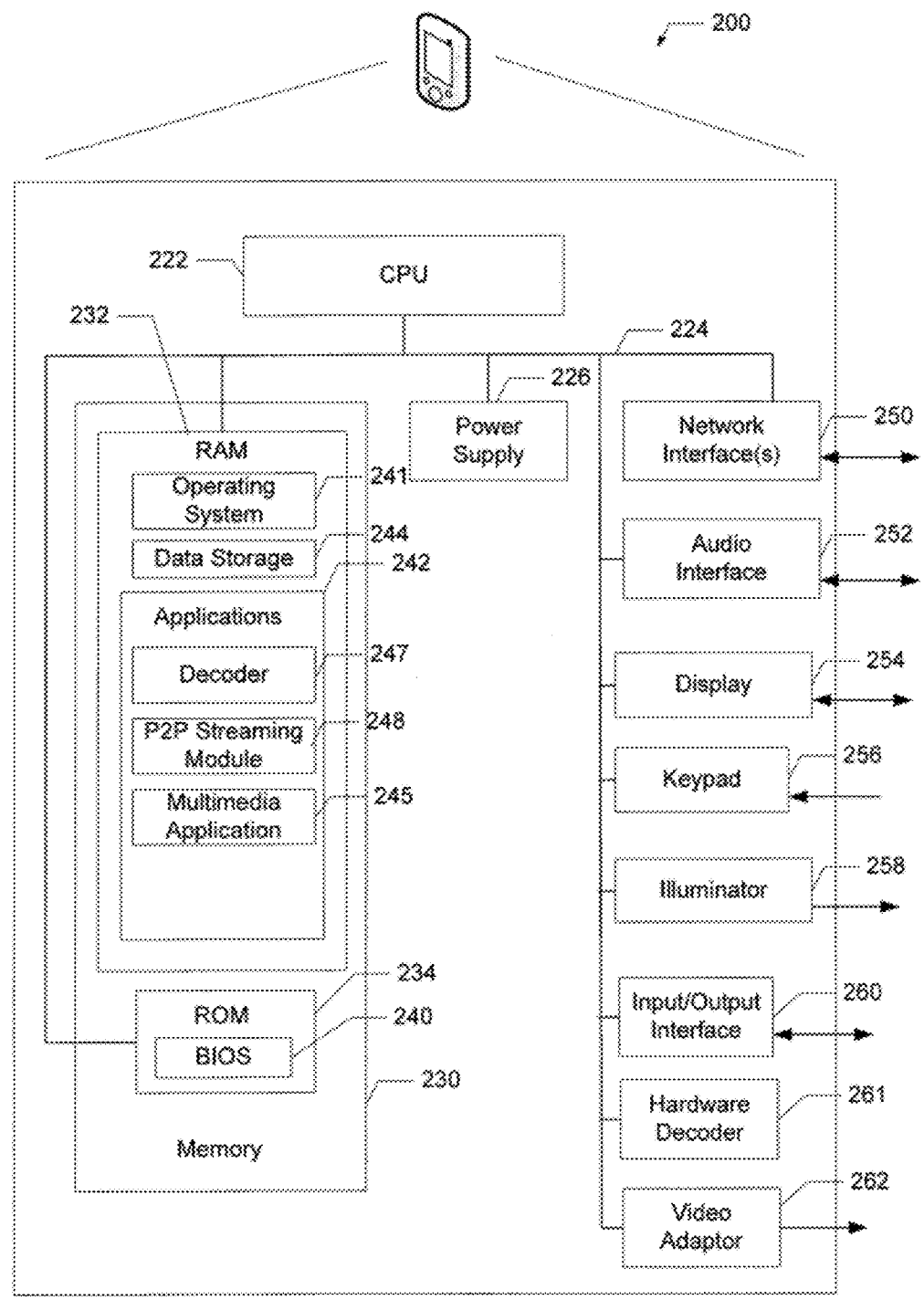
FIG. 2 depicts a schematic diagram of the mobile device shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application on the device. In another embodiment, the decoder is provided in a hardware module 261 as part of the hardware circuit in the device. The decoder is configured to decode multimedia data from the data stream received by the device and feed the decoded data to the multimedia application 245 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 200 further include a P2P streaming module, which is configured to process the coded data stream received from other computing devices through network interface 250 in accordance with a P2P transmission scheme. The P2P streaming module can be part of the decoder 247 or 261 as described above or can be a standalone application 245, which operates in conjunction with the decoder. In one embodiment, the P2P streaming module operates on top of the Internet Protocol (IP) or other networking protocol as well known in the art. The P2P streaming module is further configured to provide information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 248 is configured to perform peer indexing and discovery. In particular, the P2P streaming module 248 may broadcast through network interface 250 a message, such as the "Hello" message, to each network devices in system 100. The message also identifies certain data, such as a digital video file, that device 200 requests from other devices in the system. Upon receiving responses, the P2P streaming module 248 identifies a number of network devices that has the requested data and assigns an identification (ID) to each of these network devices. In addition, the P2P streaming module 248 also conducts negotiations with other network devices to determine transmission rates, bandwidth, packet size, etc. For example, the P2P streaming module 248 may exam the responses received from the network devices that have the requested data, and select a predetermined number of network devices according to the uplink data rate or bandwidth offered by these network devices.

In addition, P2P streaming module 248 can further provide data assembling, retransmission request, and error correction. For example, P2P streaming module 248 can generate a copy of the requested data by assembling the data streams received from a plurality of computing devices in system 100. Upon discovering that one or more portions of the data are missing or contain errors, P2P streaming module 248 can request retransmissions of the unavailable data and/or correct the errors by applying an error correction method to the received data.

Illustrative Network Devices 107-109

Figure 3:
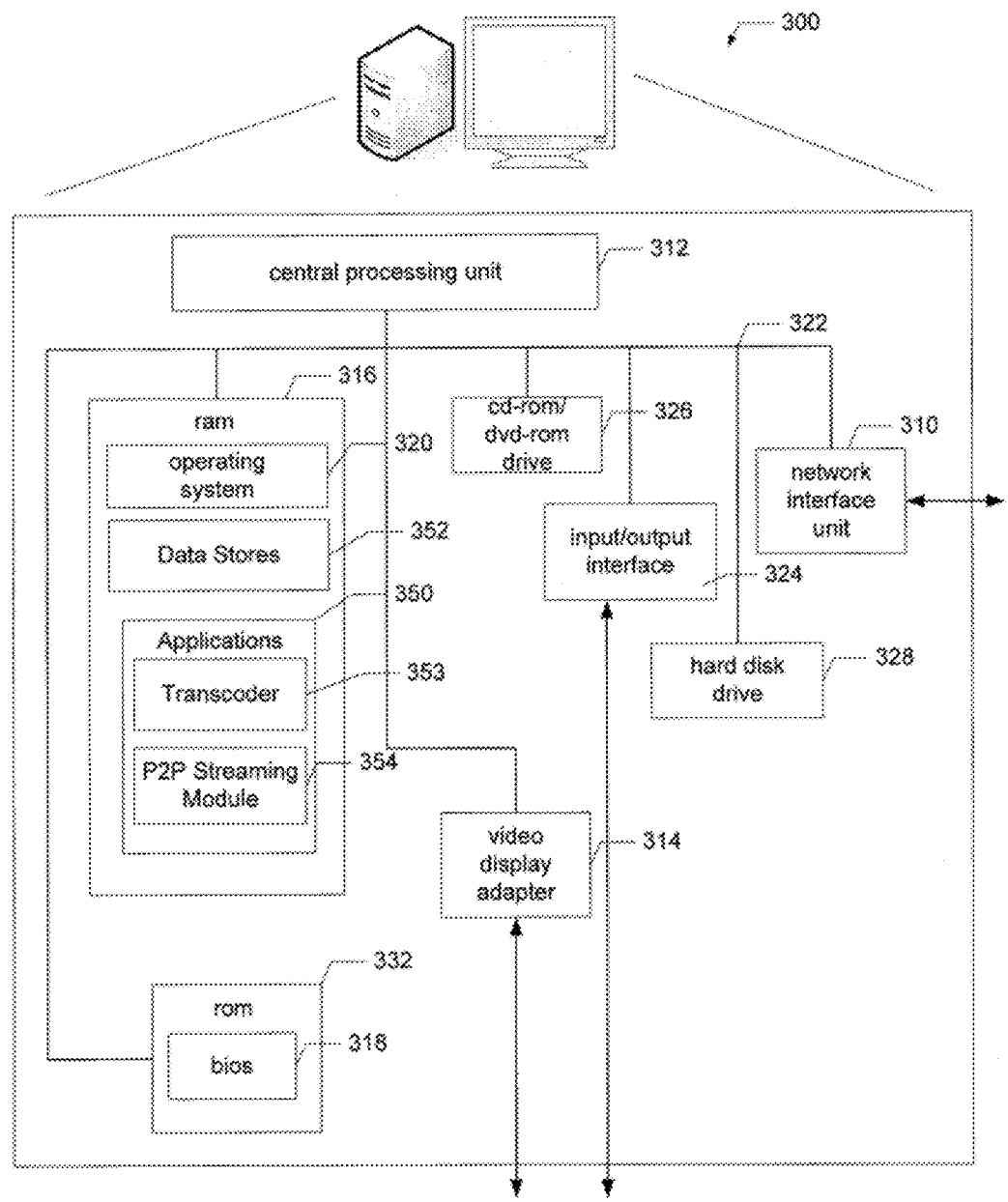
FIG. 3 depicts a schematic diagram of the fixed network device shown in FIG. 1.

FIG. 3 shows one embodiment of network devices 300. Network device 300 may include many more or less components than those shown. The components shown, however, are sufficient to disclose an illustrative embodiment for practicing the invention. Network device 300 may represent, for example, network device 107-109 of FIG. 1 and/or network device 105 of FIG. 1.

Specifically, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include transcoder 353, P2P streaming module 354, schedulers, calendars, database programs, word processing programs, HTTP programs, customizable user interface programs, IPSec applications, encryption programs, security programs, SMS message servers, IM message servers, email servers, account managers, and so forth.

Similar to P2P streaming module 248, P2P streaming module 354 provides various functions required by the P2P transmission of data, including identification of device 300 and other computing devices within system 100, index and discovery, data assembling, error correction, etc.

As will be appreciated from the teachings herein, one important consideration with respect to network debugging is the ability to reproduce an observed problem in a controlled environment. This is often very difficult to do with respect to an error observed in an operational network. In various embodiments, the invention avoids this problem by enabling operators to reproduce control software errors, data path limitations, or configuration errors using a record and replay functionality. This provides the debugger with fine-grained control for replay and observation. For example, the debugging personnel may replay selected fractions of control or data traffic over alternative hardware or ports, at a selected time pace to determine root causes of errors. This is beneficial, for example, in debugging a prototypical deployment of a novel networking technology.

It will be appreciated that there is sometimes no need to replay all traffic. For example, to debug switch CPU overload it is sufficient to record the queries sent to the switch. For debugging spanning tree convergence, it is similarly sufficient to replay a subset of the requests. On the other hand, it is sometimes beneficial to replay all traffic in a certain time window. For example, when locating memory leaks, all traffic within a predetermined time window may need to be replayed.

In an embodiment of the invention, the invention includes a computer readable medium having recorded thereon computer executable instructions for analyzing a network to assist in identification of a network defect. The computer executable instructions include instructions for receiving a user selection of traffic subset to be recorded, recording the selected traffic subset of the network traffic during network operation, and replaying at least a portion of the recorded network traffic back to the network to replicate, and thus assist in identifying, the network defect.

In another embodiment of the invention, the invention includes a replay system for replaying network traffic to the network to identify a network defect. In this embodiment of the invention, the replay system includes one or more databases linked to the network for recording at least a subset of network traffic in the network. A replay server is employed for receiving a user selection of a traffic subset to be recorded, causing at least a portion of the traffic subset to be recorded at the at least one database, and causing at least a portion of the recorded network traffic to be replayed to the network.

In general terms, within embodiments of the invention, defects can be reproduced by recording an appropriate subset of the network traffic and replaying it, e.g., at a controlled pace in a test lab. In addition, the root defect can be located by performing replay while varying subsets of the input trace in binary search fashion. Further, in an embodiment of the invention, the debugger is able to focus on relevant subparts, e.g., control messages or packet headers. Although many types of problems may be discovered and repaired using the teachings herein, example problems include switch CPU inflation, broadcast storms, anomalous forwarding, and invalid controller actions.

There are certain choices for the operator to make when employing the system according to the principles described herein. For example, the design space for the record functionality includes the question of what to record from which subset of devices. The design space for the replay functionality includes the question of what to replay at what rate and in what liveness mode (offline or online). It will be appreciated that the record functionality may record more information than the replay functionality has to use for a given session. Moreover, the replay functionality may replay the recorded data either at the same or a different relative speed to the same devices or to others, e.g., within a test network. In addition, the system is configured in an embodiment of the invention to use data recorded by the replay functionality to reconstruct additional network events for replaying.

Figure 4:
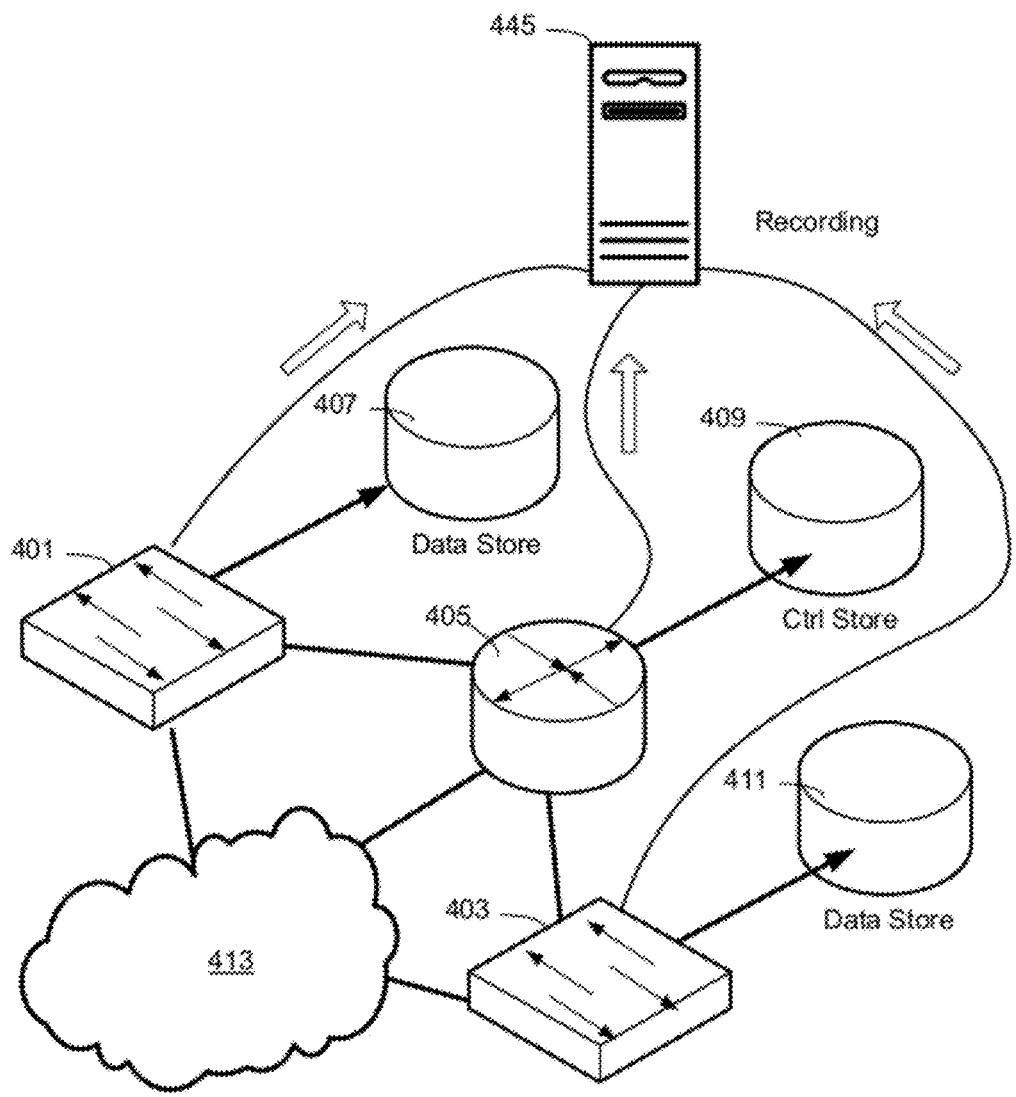
FIG. 4 is a schematic diagram showing a network analysis system during recording according to an embodiment of the invention.

An illustrative deployment scenario of the system is shown in FIG. 4. The debugging system taught herein interfaces with the hardware devices in such a way that it can record both the control traffic as well as the data plane traffic if necessary. During replay it can then inject traffic into the overall network, or the physical or logical subnetwork. Thus, the example setup includes multiple switches 401, 403, as well as a Controller 405 and record/replay databases 407, 409, 411 associated with the switches 401, 403 and Central Controller 405. The 401, 403 and Controller 405 are monitored by a record server 445, and may communicate with one another via a network 413.

As used herein, the term "failure" refers to an externally visible error in the behavior of a network. The root cause for the problem, e.g., in the program code, configuration or protocol specification, is referred to herein as the "defect." When executed, the defect leads to an "infection" of the network state, potentially leading to a failure. The examples herein refer to a single administrative domain for clarity; however the invention is not limited to geographically restricted environments. In particular, networks spanning multiple geographic locations and/or including multiple data-centers are also susceptible to defect analysis using the described principles.

For clarity, this description distinguishes between substrate control traffic and guest network traffic. The former is used for provisioning and managing the substrate, while the latter takes place inside of the guest network. Thus, there is a distinction not only between the data and control planes but also, within the control plane, between the substrate control plane and the guest control plane.

The invention is usable to detect many different types of defects. Exemplary failures and failure states and results of interest may be classified as follows:

Defective component: The root cause of a failure is a defect in a hardware device, e.g., a switch, the control software of such devices, or within the end-system software. As such, the defect, can be located within the substrate, the virtualization layer, or guest network software.

Infection Spread (single host or distributed): In some cases, only the state of a single node in the network is infected with the problem state. In this case it will generally suffice to record and replay the messages exchanged between the problem host and its environment. If the infection spreads across several hosts, all of them may be included in recording and replay.

Impact: When a node or component fails suddenly and completely, this is referred to as a crash. When a program continues to operate, but fails to adhere to its specification or protocol, this is referred to as a semantic malfunction. Performance problems do not influence the semantic behavior of a system but may erode performance, thus impacting the user experience.

Determinism: Some failures can be deterministically reproduced from the network input. Other failures cannot be deterministically reproduced even when the external input is replayed at the same time scale. Examples of such non-reproducible failures include hardware failures or software failures that depend on, e.g., a system timer or sources of non-determinism within the system such as multi-core race conditions and cryptographic random generators.

Turning to the system itself, the system includes two subsystems, namely a Record subsystem and a Replay subsystem. In turn, the Replay subsystem supports an offline mode and an online mode. In the offline mode Replay is used asynchronously with respect to Record while in the online mode Record sends its data directly to Replay. Accordingly, the Record functionality is constrained by the available storage capacity, the available network capacity, the monitoring capabilities of the network components, and the openness of the control channel. The Replay functionality is constrained by the available network capacity, the recorded data, and its synchronization capabilities.

Network openness may impact the effectiveness of network troubleshooting, in that the control plane messages that can be captured (and, thereby, the visibility into the switch operation) may be limited. However, it is still possible to perform varying levels of record and replay with the control traffic in presently deployed network devices, i.e., with respect to SNMP messages, netconf messages, spanning tree protocol datagrams, link discovery protocol datagrams, routing protocol datagrams, service port communication and other signaling protocol messages. Thus, the design is independent of the specific network architecture.

The term "traffic selection" refers to the decision as to which traffic subset will be recorded. Possible options for selection are substrate control traffic, guest network control traffic, or guest data traffic. If such a selection is unable to reduce the traffic sufficiently the system can apply either packet or flow sampling on either type of traffic as a recording reduction strategy. Another manner of data reduction is to record only the first X bytes of each packet of flow. This may suffice for recording the meta-data that is relevant for the currently debugged protocol level. This technique is beneficial, for example, in the context of intrusion detection.

In an embodiment of the invention, the system preprocess the data and extracts higher level protocol information, e.g., BGP messages, HTTP protocol headers, or OpenFlow control messages. Therefore, it is possible to decide on which level the data is recorded: the packet level, the flow level, or the application message level. Note that it is possible to combine any of the above mentioned techniques. One advantage of subselection that reduces the traffic volume significantly is that it may be enabled by default due to its low resource requirements, and thus may be useful in locating and analyzing unexpected failures. In an embodiment of the invention, different subselection strategies are applied to different network components. For example, the operator may choose a connected subset of the network or the borders of a network cloud.

The system can be used to monitor at the end-systems or within the network. The first approach makes it very easy to reconstruct the messages from one system, while the latter approach may allow aggregation which may allow fewer elements to be monitored. If the problem is due to a single element and not due to various interactions, it suffices to identify the element and only record the traffic for it. However, it is not always straightforward to identify the element responsible for the problem. While it is possible to replay all traffic recorded by the record functionality, the recorded traffic is prefilter in an embodiment of the invention according to subselection strategies, e.g., those discussed above.

When selecting the devices to which to replay the traffic the operator may either replay the traffic to the devices from which the data was recorded or may play the traffic to an alternative device. This is useful for trouble shooting as it enables regression testing. Indeed, the alternative device may run a different firmware version, have a different hardware configuration, or may even originate from a different vendor. Moreover, in an embodiment of the invention, the traffic of multiple devices is mapped to a single device, e.g., to perform stress tests. Alternatively, the operator may map the interfaces of the recorded device to a different set of interfaces of the replayed device.

With respect to traffic generation, the replay functionality has two principle operating modes: offline and online. Moreover, it enables time-stretched as well as time-contracted replay of each subset of the recorded data. In addition, it is possible to reconstruct additional network events for replaying. The offline mode involves recording and replaying as discussed above. However, it is not always possible or feasible to stop the operational network for testing and, storage requirements may be challenging. In this situation, the online mode may be beneficial, since the recorded data is piped to the replay entity. Online replay can be performed on an isolated slice of the same hardware as the production network instead of a different set of devices.

With time shifted replay of network events, the operator can adjust the speed at which certain parts of the traces are replayed, e.g., to increase the speed for the initialization phase and then slow down the pace closer to the failure to help in identifying the root cause. For some failures, the exact timing is important, whereas for others it may be irrelevant as long as the temporal sequence of the events is the maintained. When exact timing is important, synchronization among multiple Record and Replay instances is enabled via hardware support for accurate time-stamping.

Depending upon the options selected by the operator, the record functionality may collect only meta data but not the original data, e.g., only packet headers. However, for reproducing the problem one may need the full set, e.g., full packets. Therefore, in an embodiment of the invention, the system constructs dummy (synthetic) messages, e.g., packets with the same headers but random packet content.

Denial of service to network customers can occur at different levels. At the resource level, network devices possess resources (e.g., CPU, ports, bandwidth, buffer) that are shared among multiple ongoing flows for multiple users. Unless there is strict isolation, it is possible for a particular user to drain the device of a certain resource, causing starvation for other users. At the device level, there can be software defect that may be triggered by certain kinds of flows, leading to device crash. In an embodiment of the invention, the system monitors and reproduces issues at both the resource level and the device level, making it easier for network administrators to debug the network operation.

It will be appreciated that in a resource constrained environment, there is a trade-off between storage and performance on one hand and accuracy of replay on the other hand. Accurate and precise replay requires precision and completeness of the recorded data, imposing significant performance overheads. However, most failures require neither full precision nor complete coverage to detect and analyze. Indeed, high precision may be needed, if at all, only for a subset of the data. Thus, in an embodiment of the invention, only certain subsets are recorded with precision, while others are aggregated. Possible record modes include substrate control traffic only, substrate and guest network control traffic, control traffic and reconstructed data plane traffic, control traffic and subselected data plane headers, control traffic and data plane headers, full control and subselected data plane traffic, and full control and full data plane traffic. Depending on the failure under investigation this data can be used for example to recreate the situation in which the failure occurred.

With respect to failures associated with high link bandwidth utilization, particular substrate forwarding tables, and high device CPU loads, the data needed to recreate such failure cases can be summarized as follows. Reconstructing a particular substrate forwarding table only requires substrate control plane traffic. However, in some environments some forwarding table entries can be triggered by guest network control or data traffic itself. In these cases reconstructed data plane traffic or data plane headers can be used. To study routing problems within a guest network, it is useful to reconstruct a particular guest's forwarding tables. This requires recording and replaying to the substrate as well as guest network control plane. Link bandwidth utilization: analysis may require data plane replay, although the exact content of the data plane traffic may not matter. Therefore, reconstructed data plane traffic will generally suffice.

With respect to substrate node CPU load it may be difficult to identify the root cause of the failure a priori, and thus the needed level of detail for recordation may differ. It may be sufficient to replay only the substrate control traffic. Alternatively, the guest network control-plane may be included. However, data plane headers may be required if the data plane triggers certain actions which involve the CPU. Replicating the user experience, e.g., measured by throughput, RTT, loss rate, or flow setup time, typically involves data plane traffic.

In an implementation, the fault detection system described herein is based on OpenFlow, with which those of skill in the art are familiar. OpenFlow is an open protocol that enables a commodity PC (the controller) to exercise flexible and dynamic control over the data traffic passing through Ethernet switches. To this end, the traffic is grouped into flows. Each flow can be associated with specific actions, which cause its packets to be directed to a specific switch port, on a specified VLAN, or otherwise. The flow definition can be tailored to the specific application case—OpenFlow supports a 12-tuple of packet header parts that can be matched on, ranging from Layer 1 (VLAN ports), via Layer 2 and 3 (MAC and IP addresses) to Layer 4 (TCP and UDP ports). The set of flow rules known to a switch is held in a flow table.

Figure 5:
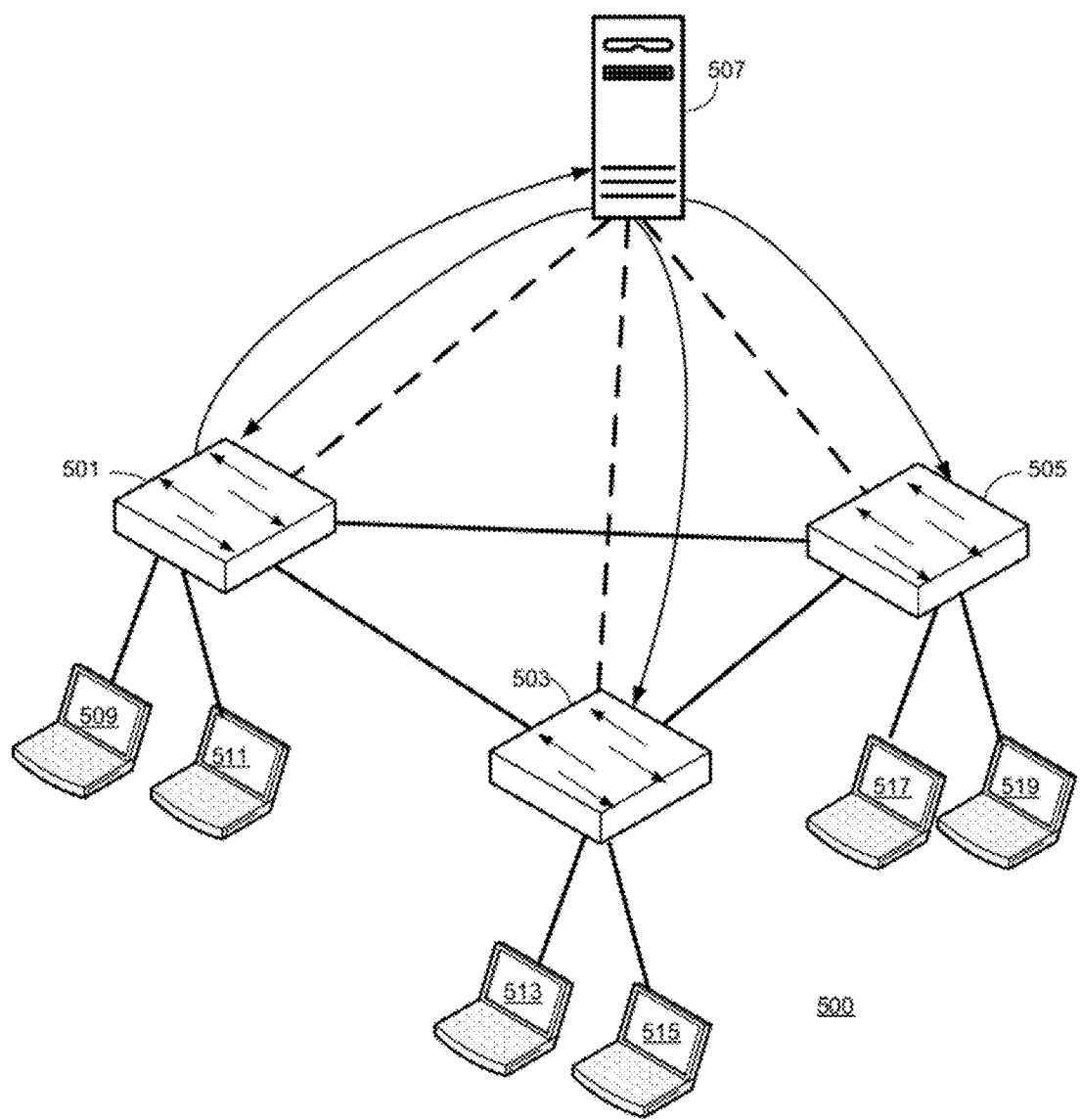
FIG. 5 is a schematic diagram showing an OpenFlow network for analysis according to an embodiment of the invention.

FIG. 5 shows an example 500 of an OpenFlow configuration. At the center are the OpenFlow-enabled switches 501, 503, 505. They are all managed by the controller 507 via the OpenFlow protocol (dashed lines). Each of the switches has two attached clients, 509, 511 (513, 515; 517, 519). Initially, the only preset rules are for ARP. If client 509 wants to communicate with client 517, the first packet from client 509 triggers, on arrival at switch 501, an OpenFlow PACKET_IN message which is sent to the controller 507. If the controller 507 decides to instantiate a flow it sends a FLOW_MOD message to the switches 501, 503, 505. The FLOW_MOD message consists of a match portion and an action portion. The match portion is responsible for selecting packets going from client 509 to client 517 by some means (e.g., source and destination IP addresses or MAC addresses).

The action portion directs the matched packets to appropriate ports. Thus, packets from this flow are sent from client 509 via switch 501, switch 503, and switch 505. The reverse direction may be setup independently when packets arrive at switch 505 for client 509 from client 517, or, alternatively, the controller 507 can decide to setup this path proactively. When the flow becomes idle or times out, the switch removes the entry from the flow table and sends a FLOW_EXPIRED message to the controller 507. This message contains summary statistics about the completed flow.

From the foregoing, it will be appreciated that OpenFlow networks can be virtualized. In this case the flow space is divided into several independent slices which can be controlled by separate OpenFlow controllers. The access to the slices as well as any mapping may be done by a dedicated purpose controller. Thus, OpenFlow control messages in this example correspond to the substrate control traffic. The guest networks' traffic consists of all packets passing through the OpenFlow switches. Moreover, the system can separate guest network control traffic and data plane traffic by tailoring the matching portions of the OpenFlow rules appropriately.

Figure 6:
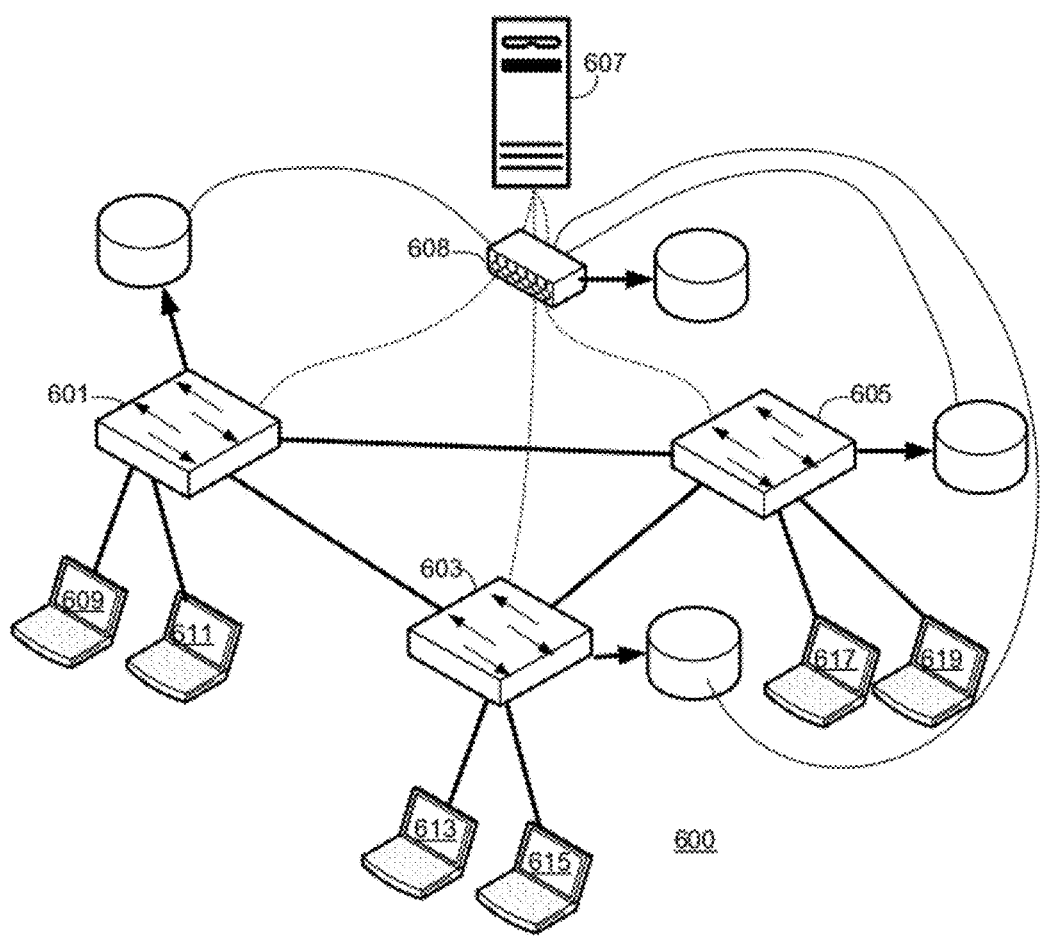
FIG. 6 is a schematic diagram showing a network implementation and analysis system according to an embodiment of the invention during recording.

To capture both the substrate control traffic and guest network traffic the system employs a hybrid strategy for implementing Record. Consider the example shown in FIG. 6, which is an extension of the example of FIG. 5. A transparent proxy server 608 is deployed in the protocol path and a local data storage node is attached to each switch. Note, the data storage does not have to be local if the network has sufficient capacity, e.g., in a separate monitoring slice.

The Record function of the proxy server 608 intercepts all messages between the switches and controller 607 and applies any subselection rules. It then stores the selected control messages to a locally attached data storage. In addition, if the guest network control and/or data traffic is to be recorded, the proxy server 608 transforms the FLOW_MOD and PACKET-OUT commands sent from the controller 607 to the switch to duplicate the required subset of selected packets to the local data storage attached to the switch. In principle, any switch along the data path can be used to record the flow. For simplicity, the illustrated example assumes that the flow is archived in a data store local to the switch at which it entered the network.

The Record function supports flexible selection of which part of the substrate or guest network traffic is recorded. In addition, flow-based-sampling can be used to record only a fraction of the data level flows. The FLOW_EXPIRED messages as provided by OpenFlow can serve as the basis for reconstructing synthetic flows during replay.

Figure 7:
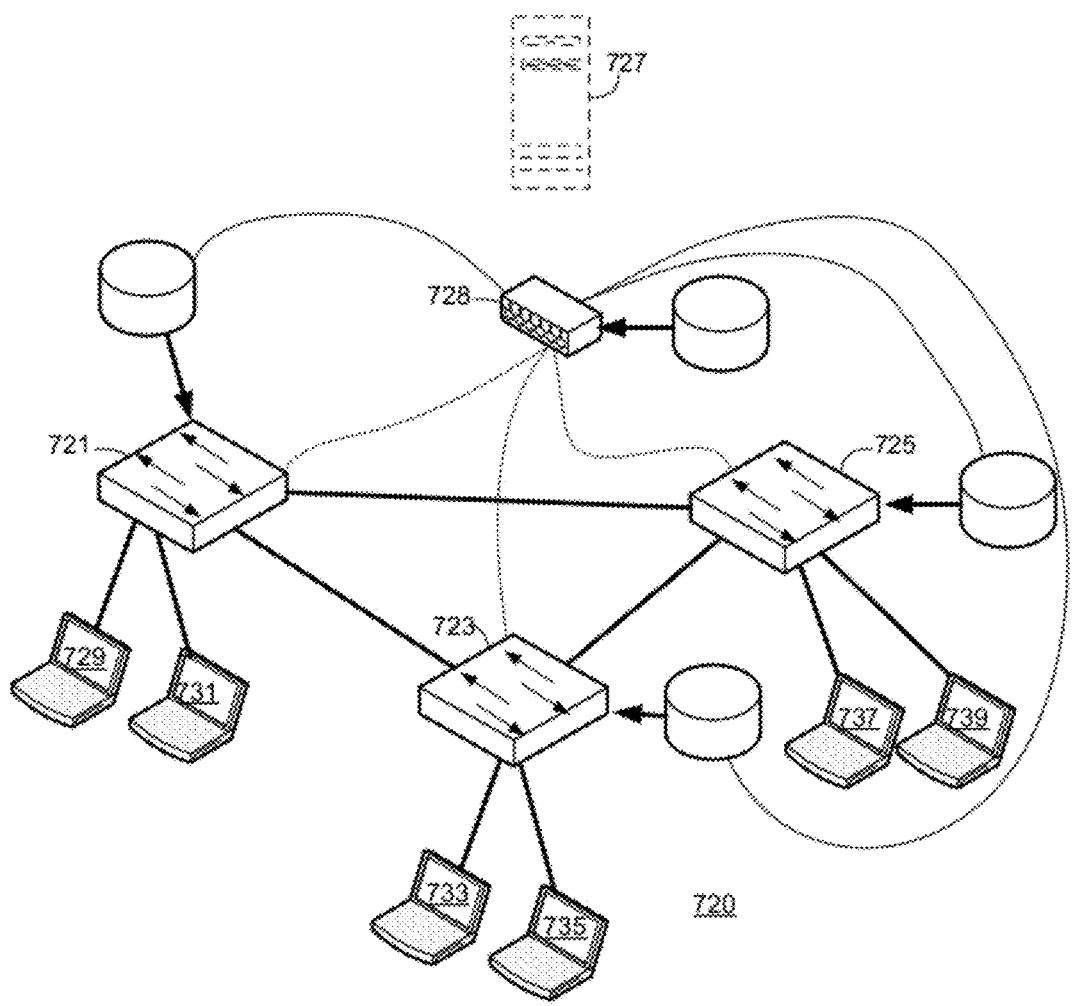
FIG. 7 is a schematic diagram showing a network implementation and analysis system according to an embodiment of the invention during replay.

FIG. 7 illustrates the Replay functionality of the system, with like elements being represented by reference numbers that generally match in the last two digits. To support testing of the different entities involved (switches, controller, end hosts), and to enable the different data replay modes outlined in the design section, Replay supports several different operation modes, as summarized below:

ctrl: In this operation mode, the replay is directed towards the controller. OfReplay (OpenFlow Replay, the replay functionality of the system) replays the recorded OpenFlow control messages from the data store. This allows for debugging of the controller application on a single developer host, with no actual OpenFlow switches or network required for the debugging. Since no real traffic is replayed, the data traffic is not required.

sw_of: This operation mode targets the switches. OfReplay replays the recorded OpenFlow control messages to the OpenFlow switches. This reconstructs the flow table inside the switches in real time. No actual data traffic is replayed. Alternatively, an embodiment of the invention is run as a guest controller, within the existing production network. This mode requires it to be placed at a level above the virtualization controller in the control hierarchy, with possibly higher level of permission, so as to be able to inspect all flows passing through the substrate.

sw_syndata: This mode adds replay of synthetic data traffic reconstructed from the FLOW_EXPIRED summary messages sent by OpenFlow switches at the end of each flow. This reconstructs the traffic characteristics on the network under test on a macroscopic level without requiring actual recording of the data plane traffic (since the FLOW_EXPIRED messages gives summary of byte/packet counts, duration and all necessary flow field values).

sw_datandr: This modes uses packet headers captured at the data-store nodes to re-generate the exact flows encountered at recording time, with dummy packet payloads. This enables full testing of the OpenFlow switch network, without involving the end host traffic.

sw_datafull: In this mode, the entire data traffic recorded by the data-stores is replayed. This allows for selective inclusion of end host traffic into the tests.

In addition to these primary operation modes, in an embodiment of the invention OfReplay enables the user to modify the recorded traffic such that it matches the replay situation. The replayed messages can be subselected based on source or destination host, ports, or message type. The message destinations can be remapped on a per-host or per-port basis. This allows the traffic to, e.g., be retargeted towards a single host, or restricted such that only relevant messages are replayed. In addition, the pace of the replay is adjustable within OfReplay. This enables the investigation of pace-dependent performance problems, and can be used to "fast-forward" over irrelevant portions of a trace. For instance, memory leaks in a switch typically take a long time to develop and we might be able to adjust the pace to reproduce it in an expedited manner.

Synchronization between the replayed data and control traffic is important for certain kinds of tests and traffic. For instance, in tests where NetRewind is used for estimating the number of dropped packets, the data traffic should not be replayed until the control traffic (containing the corresponding actions) has been replayed. In sw_synchronized mode, owing to the chronological dependency between the PACKET_IN and the FLOW_MOD, NetRewind does not replay a control message until the corresponding trigger message is received. We achieve this by using the match pattern in the PACKET_IN message, as well as the time elapsed, to identify the appropriate FLOW_MOD message to replay.

In the online replay mode OfRecord and OfReplay are combined. The OpenFlow control messages are directly replayed upon arrival, e.g., to a different set of hardware or to a different OpenFlow slice. Data traffic is also duplicated onto the second slice as required. Therefore, the online modus allows for direct, online investigation and troubleshooting of failures.

Figure 8:
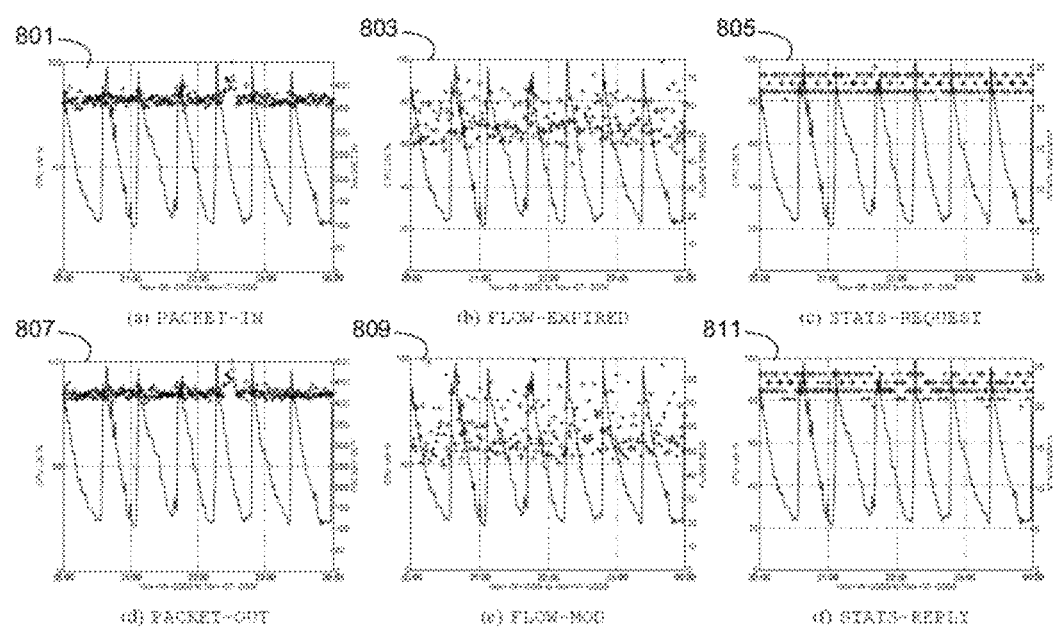
FIG. 8 is a series of plots showing CPU utilization during a time window of 4 hours.

When debugging live networks it is desirable to ensure that there are sufficient network resources available for both the network under study as well as the replay target. This can be achieved by carefully selecting parameters, e.g., the subset of the traffic for replay. Turning to an example, in a test network, the network operator observed unusual patterns in switch CPU usage MRTG plots after deploying a new OpenFlow controller. The plots 801, 803, 805, 807, 809 and 811 of FIG. 8 show the CPU utilization during a time window of 4 hours. As shown in the figure, the CPU utilization oscillated between 25% and 100% usage, roughly every 35 minutes. This CPU usage pattern started correlating with the flow setup time, which reached 100 milliseconds or more when the switch CPU was fully utilized, in the operational local area network. This is unacceptable for many users, especially for short-lived TCP connections. When a switch CPU is fully utilized, the switches may delay (or worse, drop) control messages which can explain the increased flow setup times and the poor user experience.

The cause for the oscillation of the switch CPU was unknown. There was further no correlation between number of packets in, number of packets out, number of flow modifications, number of flow expirations, number of status requests, or number of status replies with the observed behavior. Each subplot of FIG. 8 super-imposes a plot of the CPU utilization across time with one of the above statistics across time. This is an example of a situation wherein the NetRewind system described herein can be beneficially applied in reproducing certain anomalous behavior of switches, with the objective of localizing the cause, e.g., switch CPU inflation, broadcast storms, anomalous forwarding, and invalid port translation by FlowVisor.

The invention discussed herein allows reproduction of failures in a controlled environment or for debugging live networks using the online modus. To reproduce failures in a controlled environment one has to ensure that the environment is properly initialized. Therefore, it is desirable in an embodiment of the invention to reset the switches and controller if possible before starting the replay operation. This reduces any unforeseen impact by any previously installed bad state.

While replaying subsets of messages it is useful to respect the order of messages. Replaying data traffic without first ensuring that the proper matching rules are installed can be counterproductive. Since the FLOW_MOD messages are responsible for creating the flow table entries and thus prevent "misses" in the matching of packets, it is desirable to first check if the rule insertion actions (e.g., PACKET_OUT, FLOW_MOD) actions are causing the problem before moving to debugging the other OpenFlow messages, or types of PACKET_INs. This way, one can, with high confidence, conclude that one has indeed found the cause of a failure.

Figures 9A, 9B:
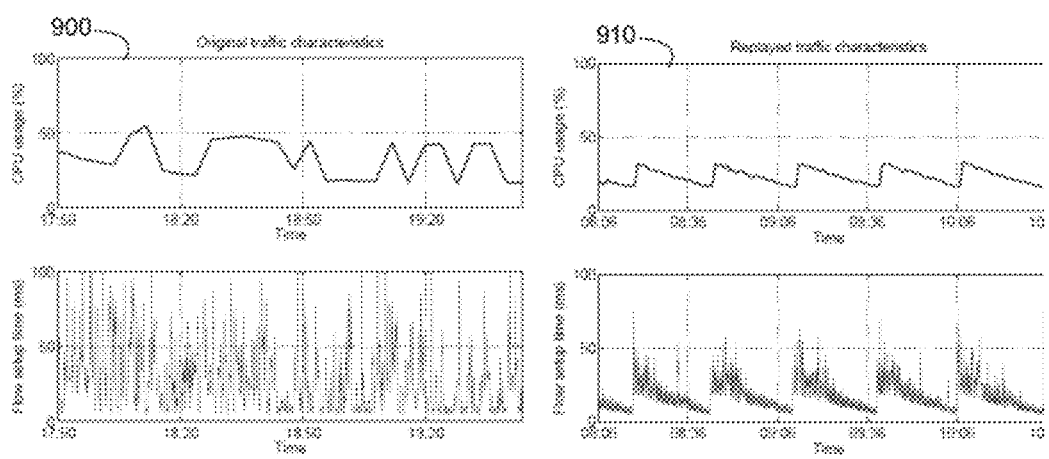
FIG. 9 is a series of plots showing a reproduction of CPU saw-tooth oscillation in an experimental setup.

FIGS. 9A and 9B show the results of the system reproducing the CPU oscillations discussed with reference to FIG. 8. As stated earlier there is no apparent correlation between the ingress traffic and the CPU utilization. To debug this using the invention, a new controller that the network operator deployed was instantiated and the system recorded all Open-Flow control traffic to the controller, and then isolated the traffic for the switch under study. When synthetic traffic was sent to the ports of the switch (while record was in progress), a version of the CPU oscillation occurred as shown in the plot 900 of FIG. 9A.

The system was used to isolate each type of control traffic and replay them separately. When replaying the port and table statistic requests, the behavior as shown in plot 910 of FIG. 9B was observed. This successful reproduction of the symptom indicates that the failure is related to sending port and table statistics requests.

Figure 10:
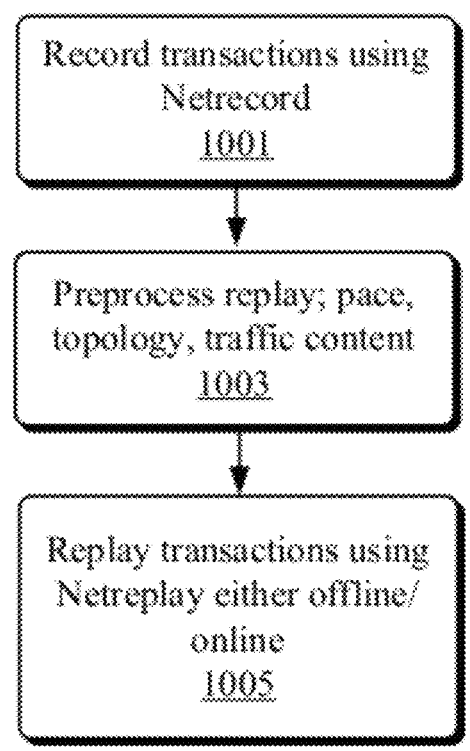
FIG. 10 illustrates a flowchart of actions performed for network troubleshooting according to an embodiment of the invention.

Turning to FIG. 10, a generic flowchart of actions performed for network troubleshooting is shown according to an embodiment of the invention. In Particular, all network transactions are recorded at stage 1001, are process in stage 1003, and are replayed to the network in stage 1005. As previously noted, it is possible to recreate a duplicate copy of all traffic within a parallel virtual network, in an online mode. This "mirroring" can be useful for a more realistic debugging. Furthermore, the mirroring provides network operators with the choice of retaining either the original virtual network or the duplicated virtual network, after the issues have been resolved. The monitoring of such traffic may be executed by (a) monitoring all virtual networks using conventional tools, (b) looking for anomalous behavior, and (c) when such behavior is found, raising an alarm.

Figure 11:
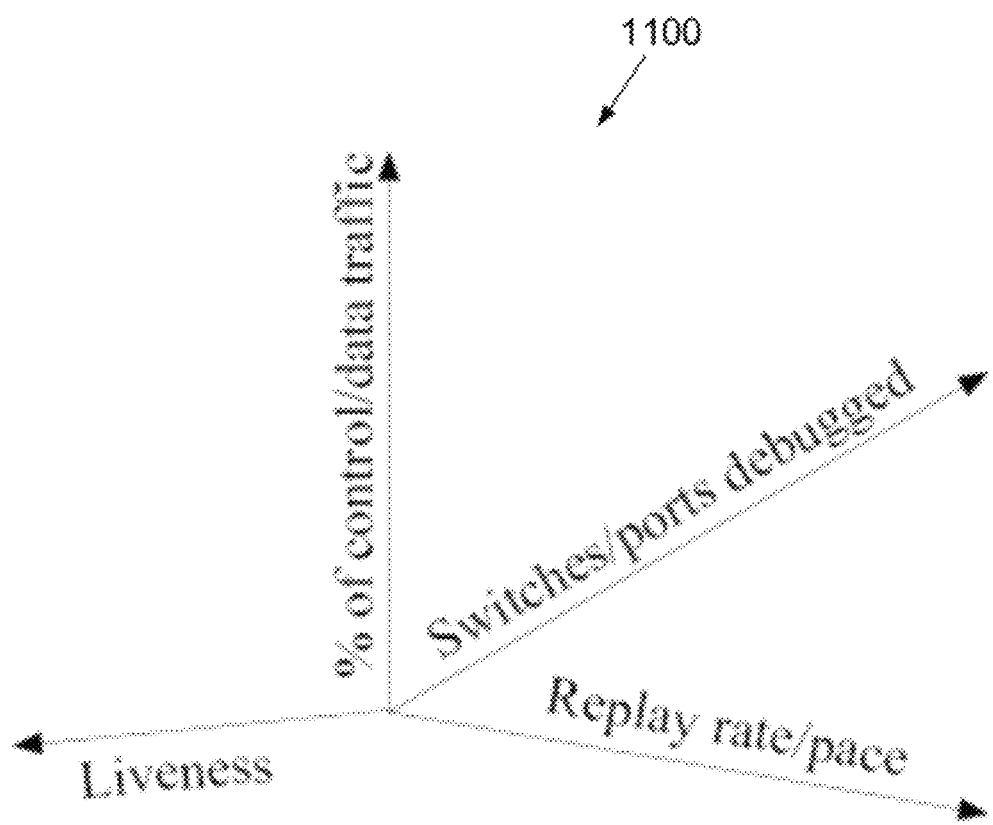
FIG. 11 is a multi-axis illustration of the design space for Replay according to an embodiment of the invention.

Referring to FIG. 11, the design space 1100 for Replay includes the question of what to replay at what rate and in what liveness mode (offline or online). As noted, Record may record more information than Replay has to use for any given experiment. Moreover, Replay may replay the recorded data either at the same or a different relative speed to the same devices or to others, e.g., within a test network. In addition, it can use data recorded by Replay to reconstruct additional network events for replaying.

Figure 12:
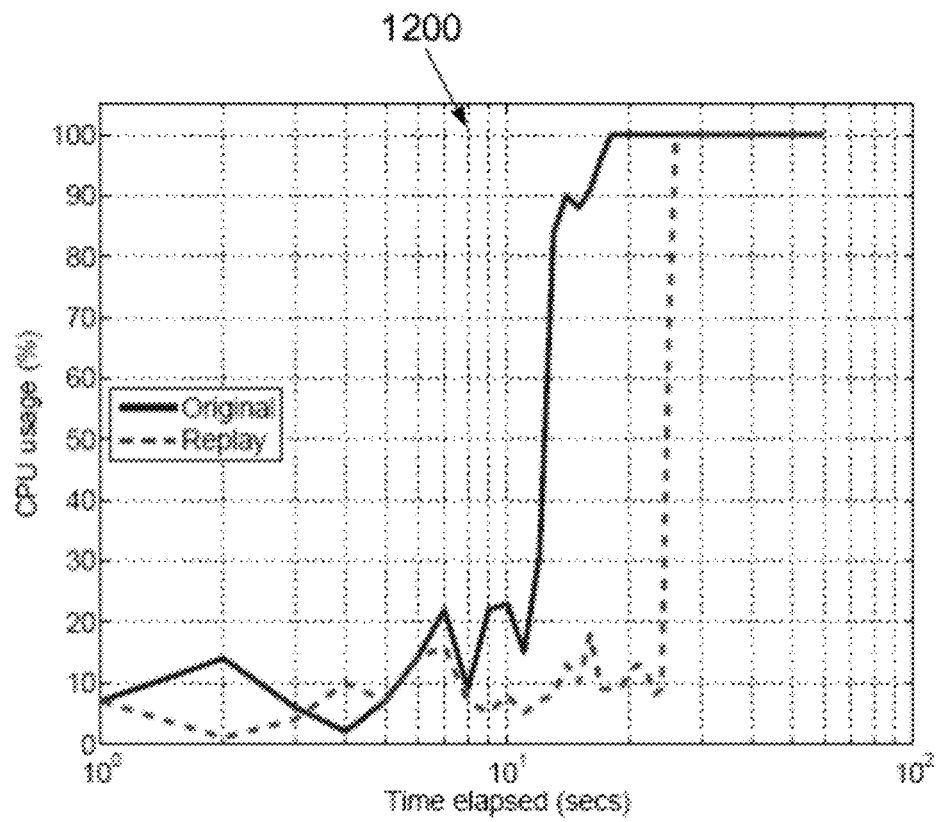
FIG. 12 illustrates a dataplot reproduction of a broadcast storm in networks where STP does not converge.

FIG. 12 is a dataplot 1200 showing a reproduction of a broadcast storm in networks where STP does not converge. The CPU spikes are out of sync because of non-determinism in the switch backoff period while connecting to the controller.

Figure 13:
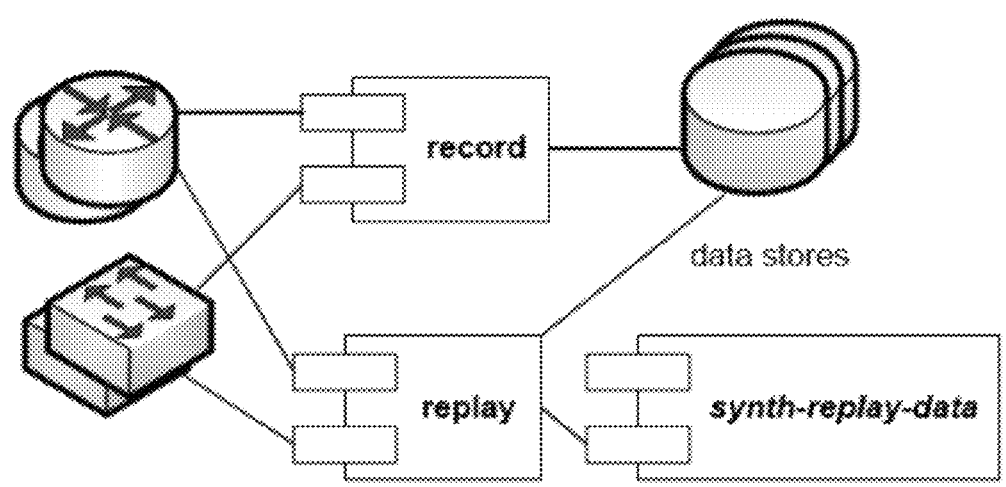
FIG. 13 shows a schematic illustration of a software component set and configuration for NetRewind in an embodiment of the invention.

FIG. 13 shows a schematic illustration of a software component set and configuration for NetRewind in an embodiment of the invention. It will be appreciated however that other designs may also be used without departing from the scope of the disclosed principles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of analyzing a network by replaying network traffic flows, the method comprising:
   providing, by a computing system, options to a user regarding which network traffic subset from a group of network traffic subsets is to be recorded for a network device;
   receiving, by the computing system, a user selection of a network traffic subset that is to be recorded for the network device;
   recording, by a recording subsystem of the computing system, the network traffic subset for the network device during operation of the network; and
   replaying, by a replaying subsystem of the computing system, at least a portion of the network traffic subset relative to the network device at a user-selected pace so as to facilitate debugging of one or more network defects, wherein the replaying includes reproducing network traffic flows between network devices, including the network device, from the operation of the network.

2. The method of claim 1, wherein the one or more network defects includes switch central processing unit (CPU) inflation, recurrent broadcast storms, anomalous forwarding, and invalid controller actions.

3. The method of claim 1, wherein the network is not operating during the replaying.

4. The method of claim 1, wherein the network is operating during the replaying.

5. The method of claim 1, wherein the replaying utilizes synthetic network traffic so as to simulate network traffic without recording contents of the network traffic.

6. The method of claim 5, wherein the network traffic includes packets, each packet having a header portion and a content portion, and wherein the synthetic network traffic includes packets having header portions matching respective header portions in the packets of the network traffic and having content portions that do not match respective content portions in the packets of the network traffic.

7. The method of claim 6, wherein the content portions of the packets in the synthetic network traffic are randomly generated.

8. The method of claim 1, wherein the user-selected pace for the replaying is the same as the pace at which the recording was performed.

9. The method of claim 1, wherein the user-selected pace for the replaying is different from the pace at which the recording was performed.

10. The method of claim 1, further comprising:
receiving a user selection of a replay mode;
wherein the replaying is based on the selected replay mode.

11. The method of claim 10, wherein the network device includes a controller, and the replaying comprises replaying recorded control messages sent from the controller.

12. The method of claim 10, wherein the network device includes a switch, and the replaying comprises replaying recorded control messages sent to the switch.

13. The method of claim 1, wherein the options provided to the user further comprise options to select a level of detail from a group of levels of detail corresponding to recording the network traffic subset for the network device, the group of levels of detail comprising: packet level, flow level, and application message level.

14. A non-transitory computer readable medium having stored thereon computer executable instructions for analyzing a network by replaying network traffic flows, the computer executable instructions comprising instructions for:
providing options to a user regarding which network traffic subset from a group of network traffic subsets is to be recorded for a network device;
receiving a user selection of a network traffic subset is to be recorded corresponding to the network device;
recording the network traffic subset for the network device during network operation; and
replaying at least a portion of the network traffic subset relative to the network device at a user-selected pace so as to facilitate debugging of one or more network defects, wherein the replaying includes reproducing network traffic flows between network devices, including the network device, from the operation of the network.

15. The non-transitory computer readable medium according to claim 14, wherein the recording includes recording at least one of control messages and packet headers.

16. The non-transitory computer readable medium according to claim 14, wherein the replaying utilizes synthetic network traffic so as to simulate the network traffic without recording contents of the network traffic.

17. The non-transitory computer readable medium according to claim 16, wherein the synthetic network traffic includes packets having header portions and content portions, and wherein the content portions randomly generated.

18. A replay system for analyzing a network by replaying network traffic flows, the replay system comprising:
a recording server, configured to:
provide options to a user regarding which network traffic subset from a group of network traffic subsets is to be recorded for a network device; and
record a network traffic subset, corresponding to a user selection, for the network device during network operation;
at least one database for storing the network traffic subset; and
a replay server, configured replay at least a portion of the network traffic subset relative to the network device at a user-selected pace so as to facilitate debugging of one or more network defects, wherein the replaying includes reproducing network traffic flows between network devices, including the network device, from the operation of the network.

* * * * *